United States Patent
Seif et al.

(10) Patent No.: US 8,788,670 B2
(45) Date of Patent: Jul. 22, 2014

(54) METHOD FOR ESTABLISHING A LINK BETWEEN THE APPLICATIONS OF AN AUTHENTICATION CARD OF A SUBSCRIBER AND AN IMS NETWORK

(75) Inventors: Jacques Seif, Paris (FR); Hervé Ganem, Villejuif (FR)

(73) Assignee: Gemalto SA, Meudon (FR)

( * ) Notice: Subject to any disclaimer, the term of this patent is extended or adjusted under 35 U.S.C. 154(b) by 258 days.

(21) Appl. No.: 13/126,904

(22) PCT Filed: Oct. 22, 2009

(86) PCT No.: PCT/EP2009/063935
§ 371 (c)(1),
(2), (4) Date: Jun. 14, 2011

(87) PCT Pub. No.: WO2010/049350
PCT Pub. Date: May 6, 2010

(65) Prior Publication Data
US 2011/0252140 A1    Oct. 13, 2011

(30) Foreign Application Priority Data
Oct. 31, 2008  (EP) .................................. 08305766

(51) Int. Cl.
*G06F 15/173* (2006.01)

(52) U.S. Cl.
USPC .......................................................... 709/226

(58) Field of Classification Search
USPC .......................................................... 709/226
See application file for complete search history.

(56) References Cited

U.S. PATENT DOCUMENTS

| 5,930,493 | A | * | 7/1999 | Ottesen et al. | 725/92 |
| 6,963,740 | B1 | * | 11/2005 | Guthery et al. | 455/410 |
| 7,076,273 | B2 | * | 7/2006 | Laumen et al. | 455/558 |
| 7,281,244 | B2 | * | 10/2007 | de Jong | 717/168 |
| 7,421,732 | B2 | * | 9/2008 | Costa-Requena et al. | 726/3 |
| 7,484,095 | B2 | * | 1/2009 | de Jong | 713/170 |
| 7,853,789 | B2 | * | 12/2010 | Audebert et al. | 713/172 |
| 7,870,153 | B2 | * | 1/2011 | Croft et al. | 707/781 |
| 8,046,824 | B2 | * | 10/2011 | Holtmanns et al. | 726/4 |
| 8,166,530 | B2 | * | 4/2012 | Adams et al. | 726/9 |

(Continued)

FOREIGN PATENT DOCUMENTS

| EP | 1 094 682 A1 | 4/2001 |
| EP | 1 608 123 A1 | 12/2005 |

OTHER PUBLICATIONS

International Search Report (PCT/ISA/210) for PCT/EP2009/063935 dated Nov. 25, 2009.
European Search Report for EP 08305766 dated Feb. 27, 2009.

*Primary Examiner* — Shripal Khajuria
(74) *Attorney, Agent, or Firm* — Buchanan Ingersoll & Rooney PC

(57) ABSTRACT

The invention relates to a method for establishing a secured link between an authentication card of a subscriber and a telecommunication network, the card being connected to a mobile terminal, wherein the method includes the steps of establishing a secure link between the terminal and an IMS network; and sharing the resources of the secure link between the terminal and the card.

6 Claims, 1 Drawing Sheet

(56) References Cited

U.S. PATENT DOCUMENTS

| | | | |
|---|---|---|---|
| 2002/0162021 A1* | 10/2002 | Audebert et al. | 713/201 |
| 2005/0149740 A1* | 7/2005 | Kotzin et al. | 713/185 |
| 2005/0164738 A1* | 7/2005 | Liu | 455/558 |
| 2006/0229090 A1* | 10/2006 | LaDue | 455/507 |
| 2007/0160085 A1* | 7/2007 | Schmidt et al. | 370/493 |
| 2007/0239857 A1 | 10/2007 | Mahalal et al. | |
| 2008/0092224 A1 | 4/2008 | Coulas et al. | |
| 2009/0086740 A1* | 4/2009 | Al-Bakri et al. | 370/401 |

* cited by examiner

METHOD FOR ESTABLISHING A LINK BETWEEN THE APPLICATIONS OF AN AUTHENTICATION CARD OF A SUBSCRIBER AND AN IMS NETWORK

The field of the invention is that of mobile telecommunications systems and more particularly relates to an improvement brought in a standardized architecture known as IMS (IP Multimedia Subsystem).

IMS architecture makes it possible to supply the users of telecommunications networks of the GSM, GPRS or UMTS types with fixed and mobile multimedia services. This system uses the VoIP (Voice over IP) technology based on a standardized 3GPP implementation of SIP (Session Initiation Protocol) operating in a standard IP (Internet Protocol) protocol.

IMS architecture supplies an intermediate layer in the core of networks for switching from the conventional mode (circuit mode) to the session mode. In other words, it makes it possible to open several sessions during the same communication. As an illustration, IMS makes it possible to mix multimedia components, for example adding a chat session to video or sending a photograph during a phone call. Starting a video session during a call is also possible, using IMS.

An IMS connection is conventionally established by the user's mobile terminal. Requesting a data channel from the IMS network establishes a secured IP connection and it is then possible to send and to receive any type of data via this channel.

The 3GPP TS 33.203 standard discloses the characteristics and the security mechanisms aiming at securing the accesses to an IMS server and more particularly how the SIP signalling is protected between the user-subscriber and the IMS server, how this subscriber is authentified and how the subscriber authentifies the IMS server.

An IMS-implementing mobile terminal thus establishes a secured channel with the IMS server and protects the communications of data with the server.

In practice, the IMS server and the subscriber make a mutual authentication and tap keys. Tapped keys are used for establishing a secured channel between the subscriber and the IMS server. The secured channel can be established using an IP-SEC (acronym for IP—secured Internet channel) as described in 3GPP TS 33.203.

IMS can be operated with any type of networks (fixed, mobile or wireless), including the packets switching functions, such as the GPRS, UMTS, CDMA 2000, WLAN, WiMAX, DSL, and the cable. Older circuit switching systems (POTS, GSM) are supported by gateways. Interfaces opened between the control and service layers make it possible to mix calls/sessions of various access networks.

In the current systems, the IMS channel is totally managed by the user's (generally mobile) terminal, typically composed of a portable telephone or a Smartphone (portable telephone coupled with a PDA). The terminal initiates and manages communication on the IMS channel. The terminal switched to the IMS mode has a particularity in that it encrypts the data it sends and decrypts the data it receives from the IMS server. The thus generated physical channel is called an IP-SEC channel.

In addition, a mobile terminal conventionally includes a card (SIM in a 2G network or UICC with a USIM aboard, in a 3G network) making it possible to authentify the user in the network. The card only plays a part in the authentication and the generation of keys giving access to the IMS networks. But the card, in the present state of the art, has no role to play when the terminal is switched to the IMS mode.

The drawback of this solution is that, if applications, for example an on-line game application or a bank application (for example enabling to pay with his/her mobile terminal), exist in the card, these cannot use the IMS channel since the access to the IMS network requires an authentication and the information transmitted between the IMS terminal and the card are encrypted. Since appropriate security mechanisms cannot be implemented, the card applications cannot be considered as IMS applications. For example, a user will not be allowed to make a payment from his/her mobile terminal while conversing (through a conventional voice channel) with the shopkeeper, if the payment application is totally implemented in the card.

One solution to remedy this problem could consist in authorizing the card to establish a new security association, between the card and the IMS network, independent of the one managed by the terminal.

The drawback of this solution however is that the resources, as regards the infrastructure, are limited to the operator which, in order to enable the users of its telecommunications network to simultaneously operate a first conventional IP-SEC channel through the functions of their mobile terminals and a second IP-SEC channel for application functions (computer programs) accommodated in the cards of such mobile terminals, would theoretically be obliged to adapt its network infrastructure and to increase its capacity. This cannot be considered, from an economical point of view.

The object of the present invention is to provide solutions making it possible to store and to execute IMS applications in the SIM card.

More precisely, one object of the present invention is to allow a user to operate the applications existing in the card from his/her mobile terminal, with the data resulting from such (in-coming or out-going) applications transiting between the card and the server via an IP-SEC channel, and thus in IMS mode, without increasing the number of available IP-SEC channels in the network.

This object, as well as other ones which will appear subsequently, is reached thanks to a method for sharing the resources of the IP-SEC connection established by the terminal. Such resources (i.e. the IP packets emitted toward the IMS server and those received from the server) are shared by the terminal and the card.

In one preferred embodiment, the sharing of resources is provided by a proxy server aboard the terminal. The proxy can use the SIP language used by the IMS applications.

In another preferred embodiment, the sharing of resources is provided by a system of the IP battery type serializing the IP packets transmitted and received by the terminal and the card. An application implementing a service for discovering the security parameters used for the connection between the mobile and the IMS network is used in the terminal.

Other characteristics and advantages of the invention will appear when reading the following description of two advantageous embodiments of the invention, given as an illustration and not as a limitation, and the appended drawings, wherein:

FIG. 1 represents a first embodiment of the method according to the invention. In this embodiment, a proxy server is used as an interface between the terminal and the card.

Knowingly, a proxy is a data server, the function of which consists in relaying requests between two stations (for example, a client station and a server).

Figure 1:
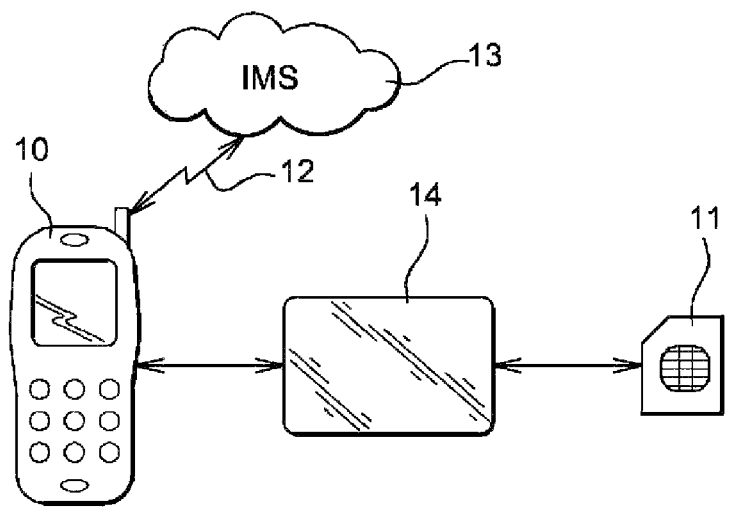
FIG. 1 represents a first embodiment of the method according to the invention.

In FIG. 1, a terminal 10, typically a mobile telephone terminal has a subscriber's authentication card 11, typically an UICC card (acronym for Universal Integrated Circuit Card). The card 11 guarantees the integrity and the security of all the types of personal data. Knowingly, it more particularly includes SIM applications in a GSM network and/or USIM applications in a UMTS network.

The card 11 also conventionally includes a processor, ROM, RAM and EEPROM memories, as well as an I/O interface circuit with the terminal 10. It further includes an ISIM Module (IP Multimedia Services Identity Module).

In operation, the user of the terminal 10 is in radio communication (voice channel not shown) with another user. Knowingly and as previously disclosed, the terminal 10 is able to request the opening of an IMS channel 12 from an IMS server 13. The channel 12 corresponds to the previously mentioned secured IP-SEC channel. For this purpose, the terminal 10 contains one application providing the encryption of data, which it sends to the server 13 and the decryption of data received by this server 13.

According to the invention and in order to enable the applications existing in the card 11 to take advantage of the existence of the secured channel 12, a proxy server 14 is provided at the level of the terminal 10. The function of the proxy server 14 is limited to interfacing (repeater function) between the terminal 10 and the card 11 for the IMS application.

The card 11 can become aware that the proxy server 14 exists by various means, the simplest one being for the terminal 10 to send one piece of information (for example an APDU or through another signalling mechanism) to the card 11, mentioning the existence of the server 14. If one application in the card, for example a bank application intended to check a signature, needs to use the channel 12, it can also request the terminal 10 to open a communication via the proxy 14.

The card can become aware of the existence of the proxy by storing information in a file, through one APDU transmitted from the terminal to the card, through a command encapsulated in an IP packet, through an implicit discovery (try-and-error) i.e. the card tries to contact the proxy: if it answers, the service starts, if it does not, the application stops. Such commands or solicitations can be directly executed with the proxy or by contacting other contacts in the card conventionally used or new ones (for example a discovery table or a request for a discovery on IP).

Data sent by the terminal 10 to the proxy 14 (and intended for the card 11) is not encrypted by the terminal. In order to ensure the protection of end-to-end exchanges (between, for example, the banking application in the card and the remote bank server), the contents of the messages which transit as a plain text between the terminal 10 and the card 11 can contain encrypted data. When the card receives data, it processes the data (in the IMS application it contains) and the answer data is then re-encrypted when it is sent back to the terminal 10 via the proxy 14 in non-encrypted SIP messages, except for some application data encrypted by the card. This may, for example, be the encryption of a signature in a bank application. The terminal 10 encrypts the whole SIP message to send it to the server 13.

The card 11 can thus supply and access secured IMS services without requiring the opening of another IP-SEC channel.

One alternative solution consists in implementing, on the mobile, a service for discovering the parameters of the security association established between the mobile and the IMS network. Such parameters include among other things the list of the encryption algorithms used as well as the numbers of ports to be used for transmitting data. Such parameters are typically stored in the mobile in a table which can be accessed by the IMS applications through a programming interface enabling these to use the IP-SEC channel. The discovery service shown here can use the same means as those available to the IMS applications.

Figure 2:
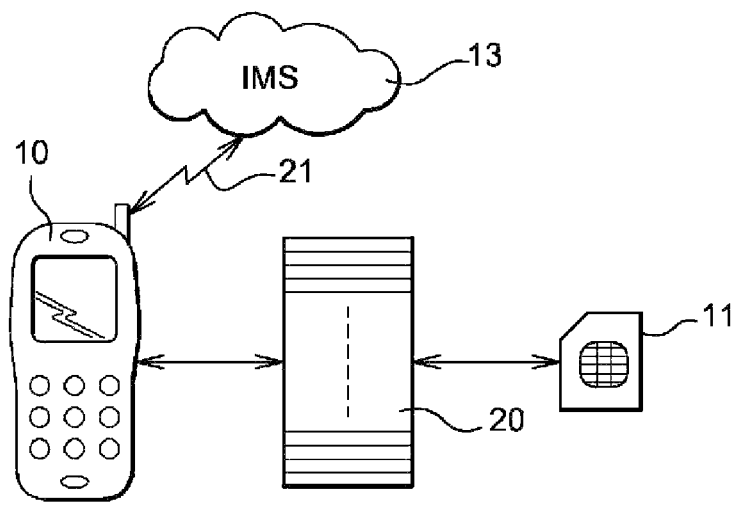
FIG. 2 represents a second embodiment of the method according to the invention.

FIG. 2 shows a second embodiment of the method according to the invention.

In this second embodiment, the proxy 14 in FIG. 1 is replaced by a system of IP battery 20 which serializes the IP packets transmitted and received by the terminal 10 and the card 11. A discovery service can be implemented there too, so that the card 11 can be aware that the system of IP battery 20 exists.

The packets received from the terminal 10 and from the card 11 are transmitted as soon as possible to the IMS server 13 on an IP-SEC secured connection 21. The same mechanism operates for transmitting the descending IP packets, from the IMS server 13 to the terminal 10 and the card 11.

The battery 20 management may be left either to the terminal 10, or to the card 11, with the operation being substantially of the FIFO type. The battery 20 can physically be accommodated in the terminal 10 or in the card 11.

Data received and to be transmitted are decrypted and encrypted locally, i.e. either in the terminal 10, or in the card 11.

Like channel 12 in FIG. 1, the channel 21 conveys enciphered packets only.

The above description was given as an illustration only and not as a limitation and the person skilled in the art will easily imagine other embodiments of the present invention within the scope of the claims.

The invention claimed is:

1. A method for establishing a secured connection between an authentication card of a subscriber to a telecommunication network and such network, with said card being connected to a mobile terminal, said method comprising:
   establishing a secured IP multimedia subsystem (IMS) communication channel between said terminal and a network, enabling said terminal to utilize the IMS communication channel and operate in IMS mode; and
   sharing the resources of said secured IMS channel between said terminal and said card, enabling the card to utilize the IMS communication channel to execute an application thereon concurrently with the terminal's use of the IMS communication channel to operate in IMS mode.

2. The method according to claim 1, wherein said resource sharing is provided by a proxy server aboard said terminal.

3. The method according to claim 1, wherein said resource sharing is provided by a system of the IP battery type serializing IP packets transmitted and received by said terminal and said card.

4. The method according to claim 1, wherein during IMS mode, the terminal is provided multimedia services for at least one of conducting telephone calls and downloading videos.

5. The method according to claim 1, wherein during IMS mode, the terminal is enabled to mix multimedia components.

6. The method according to claim 5, wherein the multimedia components include at least a telephone call, chat session, video session and photograph.

* * * * *